Dec. 1, 1959 R. A. JEWELL ET AL 2,915,320
PRESTRESSED UPPER FIFTH WHEEL ASSEMBLY FOR TRAILERS
Filed Jan. 28, 1958 3 Sheets-Sheet 1

INVENTORS
Robert A. Jewell and
Johnny T. Watters
BY Mason, Fenwick & Lawrence
ATTORNEYS Dec. 1, 1959  R. A. JEWELL ET AL  2,915,320
PRESTRESSED UPPER FIFTH WHEEL ASSEMBLY FOR TRAILERS
Filed Jan. 28, 1958  3 Sheets-Sheet 2

INVENTORS
Robert A. Jewell and
Johnny T. Watters
BY Mason, Fenwick & Lawrence
ATTORNEYS Dec. 1, 1959  R. A. JEWELL ET AL  2,915,320
PRESTRESSED UPPER FIFTH WHEEL ASSEMBLY FOR TRAILERS
Filed Jan. 28, 1958  3 Sheets-Sheet 3
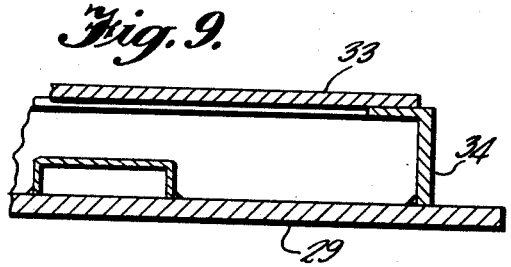
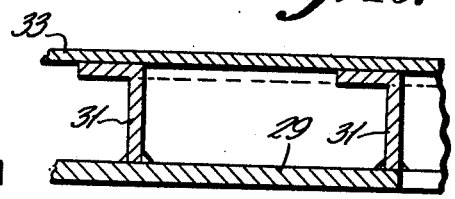
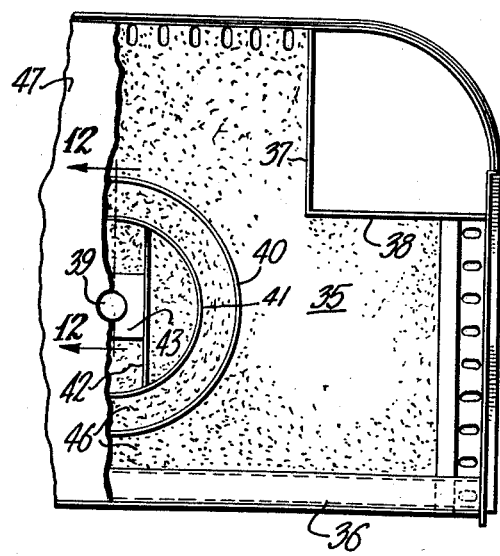
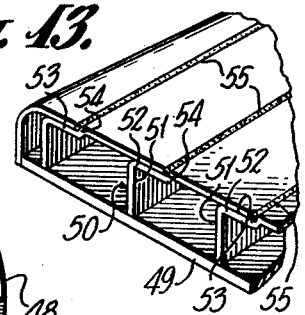
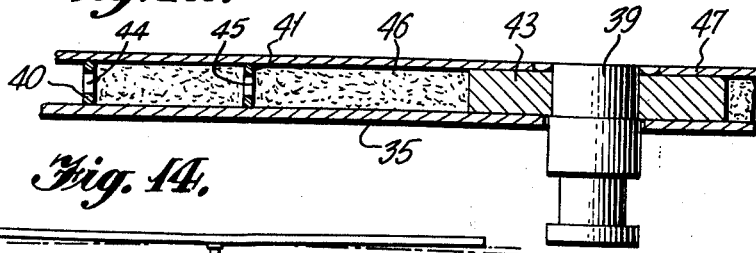
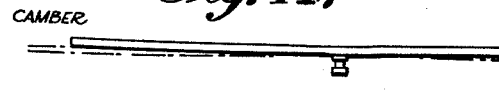
INVENTORS
Robert A. Jewell and
Johnny T. Watters
BY Mason, Fenwick & Lawrence
ATTORNEYS United States Patent Office 2,915,320
Patented Dec. 1, 1959

2,915,320

PRESTRESSED UPPER FIFTH WHEEL ASSEMBLY FOR TRAILERS

Robert A. Jewell and Johnny T. Watters, Savannah, Ga., assignors to Great Dane Trailers, Inc., Savannah, Ga., a corporation of Georgia Application January 28, 1958, Serial No. 711,617

11 Claims. (Cl. 280—106)

This invention relates to fifth wheel structures for trailers and particularly to the upper fifth wheel assembly carried by the trailer.

It has become quite important that trailers have a continuous, single level, floor from end to end, thus eliminating the stepped floor with the raised forward section necessitated by the conventional thick upper fifth wheel construction. Several trailers have been proposed having thinner fifth wheels to permit flush floors, but they have not been as thin as desired and problems have arisen due to lack of requisite strength in the thinner structure.

It is the object of the present invention to provide an upper fifth wheel structure which will be extremely thin yet have great strength, and be ideally suited to single-level floor construction.

Another object is the provision of such structure which may be fabricated from standard available materials without need for special castings, die pressed members, etc.

A further object is to provide a fifth wheel structure which will form a part of the trailer floor, when installed, and will need no supporting structure.

Yet another object is to provide an extremely thin upper fifth wheel assembly in which the component parts are stressed so that the entire structure is given a camber to resist bending under load.

Other objects of the invention will become apparent from the following description of practical embodiments thereof when taken in conjunction with the drawings which accompany, and form part of, this specification.

In the drawings:

Figure 9 is a section taken on the line 9—9 of Figure 8;

Figure 10 is a section taken on the line 10—10 of Figure 8;

Figure 11 is a view similar to Figure 8 showing a further modification;

Figure 12 is a section taken on the line 12—12 of Figure 11;

Figure 13 is a fragmentary perspective showing a further modification of the invention; and Figures 14 and 15 are schematic front and side views of a typical upper fifth wheel assembly of the present invention, to illustrate the camber given the structure during fabrication.

Figure 1:
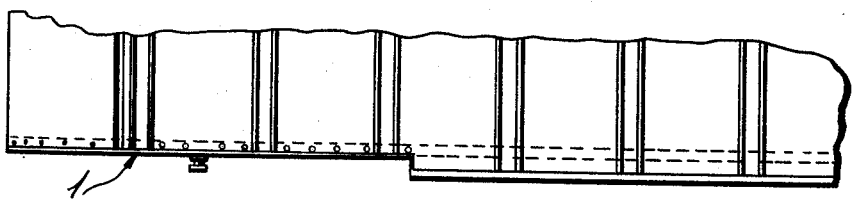
Figure 1 is a fragmentary side elevation, showing the lower front portion of a trailer having an upper fifth wheel structure embodying the principles of the present invention.
Figure 2:
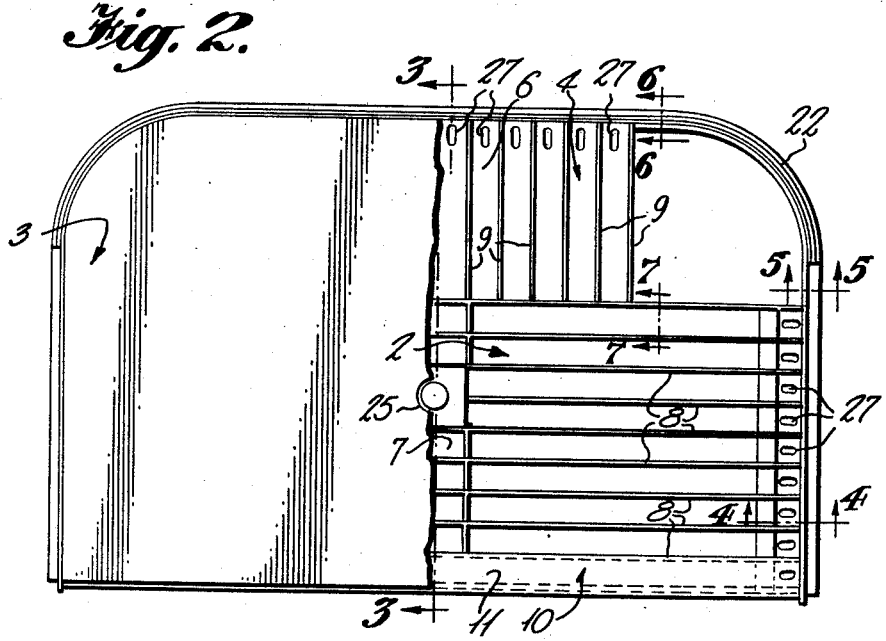
Figure 2 is a plan view of the fifth wheel with a part of the top cover plate broken away to show interior structure.
Figure 3:
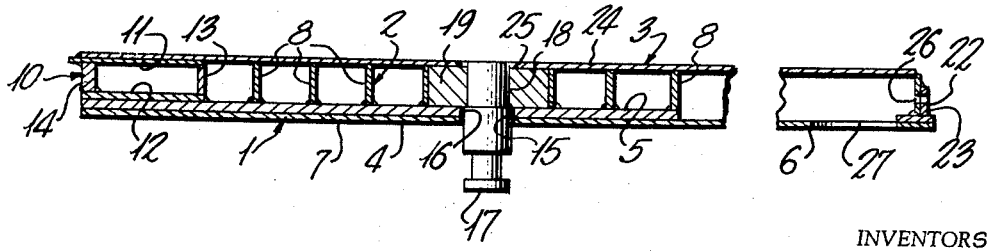
Figure 3 is a central vertical section through the structure, taken on the line 3—3 of Figure 2.
Figure 4:
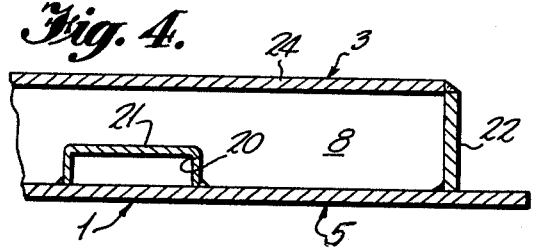
Figure 4 is a fragmentary section through one side of the structure, taken on the line 4—4 of Figure 2.
Figure 5:
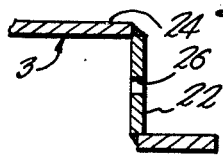
Figure 5 is a section taken on the line 5—5 of Figure 2.
Figure 6:
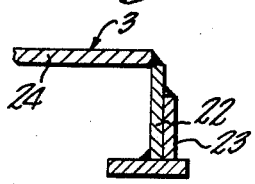
Figure 6 is a section on the line 6—6 of Figure 2.
Figure 7:
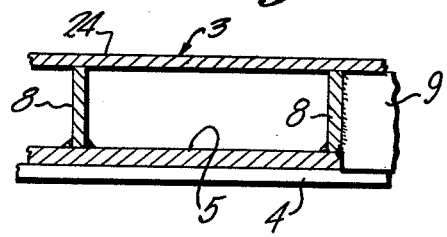
Figure 7 is a section on the line 7—7 of Figure 2.

In general, the fifth wheel of the present invention includes a generally T-shaped bottom, a grid or other spacing and reinforcing structure, rigidly connected to the bottom, a perimetral frame attached to the grid and bottom, a top connected to the frame, and a king pin connected to the underside of the top, with the entire lower structure stressed before attachment of the top to provide a camber for the unit and put the top in tension.

Referring to the drawings in detail, and first adverting to that form of the invention shown in Figures 1 to 7, inclusive, the fifth wheel is shown as composed of a bottom 1, a grid 2 and a top 3.

The bottom is formed of two plates, 4 and 5, positioned at right angles to one another and in partial overlapping relation. Plate 4 is on the bottom, and extends from front to back of the unit and centrally thereof. Plate 5 rests on top of plate 4 with its back edge aligned with the rear edge of plate 4. The plates are so proportioned that plate 4 projects forwardly beyond the front edge of plate 5, and plate 5 projects laterally equal amounts beyond the side edges of the plate 4. Thus, a T-formation is made, with the head of the T formed by the plate 5 and extending transversely of the unit and the leg formed by the forwardly projecting portion 6 of plate 4. This arrangement provides double plate thickness throughout that area 7 upon which the load will be imposed when the fifth wheel is in a trailer and is resting upon the lower, tractor-carried assembly.

The grid 2 is composed of two groups of spacing strips 8 and 9. The strips 8 extend the full width of plate 5 and lie in spaced parallel relation throughout the major portion of the depth of the plate. Strips 9 are at right angles to strips 8 and extend over the projecting portion 6 of plate 4. Strips 8 are welded along their bottom edges to plate 5, and strips 9 are welded to the projecting portion 6 of plate 4. The ends of strips 9, abutting the first strip 8, are welded to that strip, thus uniting the two sections of the grid and, through the grid, the two bottom plates. The spacing strips of the two sets are of different height, with the strips 9, which are secured to the bottom plate 4, being higher so that the top surfaces of all of the strips will be in a common plane.

The rear edge of the assembly is stiffened by a box-like girder 10 which is fabricated from top and bottom plates 11 and 12 held in spaced relation by means of spacing strips 13 and 14 extending along the side edges of the plates 11 and 12. The rearmost strip 14 is considerably heavier than the other strips, and is more nearly in the form of a bar. The elements of the girder are welded to each other, and the bottom plate of the girder is welded to the plate 5 along its inner edge.

The plates 4 and 5, in the overlapped area, are provided with aligned openings 15 and 16 to allow a king pin 17 to project through the plates for attachment to the lower fifth wheel section carried by the tractor. The upper end of the king pin is press fitted into a bore 18 in a block 19 which seats upon the upper plate 5 between two of the spacer strips 8. As shown, the block is double the spacing between adjacent spacer strips 8 and one of the strips will be cut away at its center to permit the block to be seated. To further rigidify the assembly in a fore and aft direction in the region of the block, the spacer strips 9 in that area may be continued across the plate 5 to the block and from the block to the rear girder 10.

If desired, the spacer strip 8 on one side of the assembly may be notched, as at 20, to permit a channel 21 to extend across the plate 5. The channel, with the plate, forms a tubular housing through which wires, brake lines, etc. may be passed.

The ends of the spacer strips are welded to a frame member 22 which extends across the front and along the sides of the assembly. This may be a single strip, or it may be reinforced in desired areas by means of a narrower strip 23, as shown. The frame 22 is also rigidly connected to the base plates as by welding.

The above described structure completes the construction of the base, or bottom, grid and frame of the assembly. Before applying the cover plate 24, the entire structure previously described is stressed in two directions by flexing the edges upwardly. The structure is flexed transversely to produce a side to side camber as shown in Figure 14. The front section is flexed to form a fore and aft camber from the front edge to the king pin as shown in Figure 15. With the structure held flexed in this manner, the top cover 24 is put into position and welded around the periphery to the underlying structure. The weld will be to the frame 22 across the front and along the sides, to the top plate 11 of the girder 10 across the back edge, and to the spacer strips. When the structure is released, it will tend to return to its unflexed condition, pulling the top cover straight and taut. The cover, in turn, will hold the lower structure in stressed condition, maintaining the proper camber.

The cover plate 24 has a central opening 25 to surround the king pin 17. The king pin will be welded to the block 19 and the block, in turn, will be welded to the cover plate along the edge of the opening 25.

The upper fifth wheel assembly, as described, is to be attached directly to the front and side walls of the trailer and will become a portion of the trailer floor. To this end, bolt openings 26 are provided in frame 22 spaced along the frame length and access openings 27 are formed in the edges of the plates 4 and 5 to permit insertion of bolts through the bottom wall of the assembly and placement in the openings 26.

The material from which the assembly is made may be any light-weight material of sufficient compressive strength, or it may be a suitable thin honeycomb type core structure.

Figure 8:
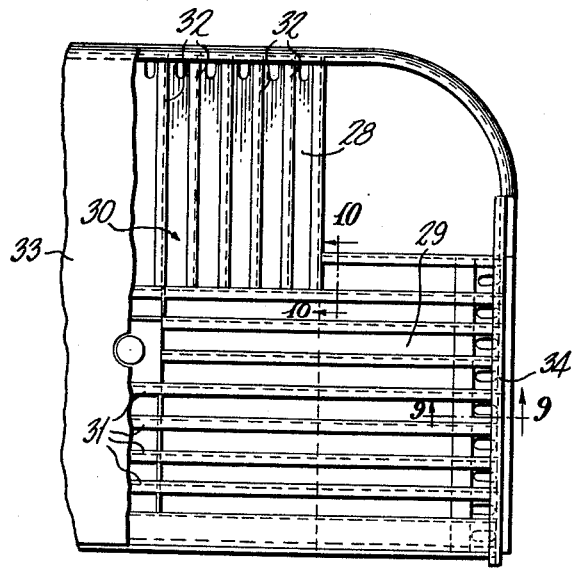
Figure 8 is a partial top plan view of a slightly modified structure, a portion of the top plate being broken away to show internal structure.

In Figures 8 to 10, inclusive, a slightly modified structure is shown which is suitable for use where extremely heavy loads are to be carried. In this form, the same arrangement of superposed base plates 28 and 29 are used with a grid 30 rigidly secured to the plates. The difference in structure is in the spacer strips used to form the grid. Substantially the same arrangement of strips has been used, but the strips 31, welded to the plate 29, and 32, welded to the plate 28, are angle members to provide additional stiffness and strength. In this form, as before, the assembly of bottom plates, grid and frame 34 is stressed prior to application of the cover plate to provide the desired camber.

Figures 11 and 12 show another structure which may be used. Here, the structure is designed for relatively light work where insulation is necessary. In this case, a single bottom plate 35 is used, shaped in the form of a T as were the combined plates of the previously described forms. The rear box-like girder 36 is used, and spacer strips 37 and 38 are along the edges of the bottom plate adjacent the front corners of the assembly. The remainder of the grid is positioned centrally, about the king pin 39. It consists of two circular spacers 40 and 41 of different diameter, positioned upon plate 35 concentrically about the king pin, and a pair of strips 42 bridging the inner circular spacer and extending along the sides of the king pin block 43. The circular spacers are provided with openings 44 and 45 so that insulation 46 can be blown, or otherwise forced, into the completed structure. If the insulation is foam type, or of a material which hardens after application, the openings in the spacers will serve as keyways to tie the several insulation areas together. The assembled base structure is flexed as with the other forms before the top 47 is attached to the rim 48.

In Figure 13 still another means of fabrication is shown. Here, the base 49 has a grid 50 composed of members having vertical legs 51, which take the place of the spacer bars of other forms, and horizontal legs 52 projecting from their tops and combining, when joined together, to form a cover plate for the unit. The legs 51 are welded to the base 49 along their bottom edges. The horizontal legs are stepped so that each one has a seat 53 to receive the free edge of the horizontal leg of the next adjacent member. The edge of the flange on the seat will stop short of the shoulder 54 formed at the side of the seat to allow for flexing the bottom plate upwardly to stress it, and for a weld to be made along the free edge of the horizontal member. When all of the grid members are in place, the bottom plate is stressed as in the other forms which will cause the horizontal legs to move closer together. While in this position the welds are made, as at 55, and the joined legs will form a top cover.

It will be noted that in all of the forms the unit is composed of one or more bottom plates, a grid attached to the bottom and a top which serves to hold the lower assembly in stressed condition with a camber in both directions.

While in the above several embodiments of the invention have been shown and described, it will be understood that the specific structural details disclosed are merely by way of illustration and the invention may take other forms within the scope of the appended claims.

What is claimed is:

1. In an upper fifth wheel structure suitable for use with vehicle trailers, a bottom sub-assembly, a cover, and a king pin carried by said structure, said sub-assembly comprising a bottom, a frame secured to said bottom and positioned around the bottom, and a grid composed of a plurality of vertical spacers positioned on the bottom and secured to the bottom and frame, said sub-assembly being flexed transversely to bow the bottom and to raise the sides above the center and flexed from an intermediate point forwardly to raise the front above the intermediate point, and said cover secured around its edges to the frame to hold the sub-assembly in pre-stressed condition.

2. In an upper fifth wheel structure as claimed in claim 1, said bottom comprising a pair of rectangular plates superposed one upon the other to form a T having an area of double thickness with single thickness areas projecting laterally therefrom in both directions and forwardly therefrom, the king pin being mounted centrally of the double thickness area.

3. In an upper fifth wheel structure as claimed in claim 2, said spacers being strips arranged lengthwise of the two plates forming two groups, with the strips of one group extending completely across said structure from side to side parallel to one another spaced across the bottom plate upon which they are positioned, and the strips of the other group extending at right angles to the strips of the first group and overlying the forwardly projecting portion of the underlying plate, the strips being welded along their bottom edges to the plates upon which they rest and the strips of the group overlying the forwardly projecting portion of the underlying plate being welded to one of the strips of the other group.

4. In an upper fifth wheel structure as claimed in claim 1, said spacers comprising strips arranged in two groups with the strips of each group in spaced parallel relation, one group having its strips extending widthwise of the structure from side to side and the other group positioned centrally of the first group with its strips at right angles to the strips of the first and extending from the first group forwardly of the structure, all of the strips being welded along their bottom edges to the bottom.

5. In an upper fifth wheel structure as claimed in claim 4, said vertical spacer strips each having a top horizontal flange to form an angle strip.

6. In an upper fifth wheel structure as claimed in claim 1, that portion of the frame across the rearmost edge of said structure being a tubular member.

7. In an upper fifth wheel structure as claimed in claim 1, a block seated upon said bottom within said grid, said block having a vertical opening therethrough to receive said king pin, the king pin being secured to the block and the block being secured to said cover.

8. In an upper fifth wheel structure as claimed in claim 1, said frame having openings therethrough spaced along its length to receive bolts for attaching the structure to the front and side walls of a trailer, and said bottom having a plurality of access openings therein adjacent the openings in the frame to permit the passage of bolts for insertion in the openings in the frame.

9. In an upper fifth wheel structure as claimed in claim 1, said grid including spacers which are circular in form and positioned concentrically with respect to the king pin.

10. In an upper fifth wheel structure as claimed in claim 9, said circular spacers having openings therein affording communication through the spacers, and said structure being filled with insulation.

11. In an upper fifth wheel structure as claimed in claim 1, said spacers being arranged parallel to one another, said cover composed of interconnected sections each forming a horizontal flange along the top edge of one of the spacers.

References Cited in the file of this patent

UNITED STATES PATENTS

| | | |
|---|---|---|
| 1,908,684 | Buchanan | May 16, 1933 |
| 2,714,516 | Brown | Aug. 2, 1955 |
| 2,838,324 | Dalton | June 10, 1958 |
| 2,841,415 | Black | July 1, 1958 |
| 2,846,235 | Curell | Aug. 5, 1958 |